Figure 1:
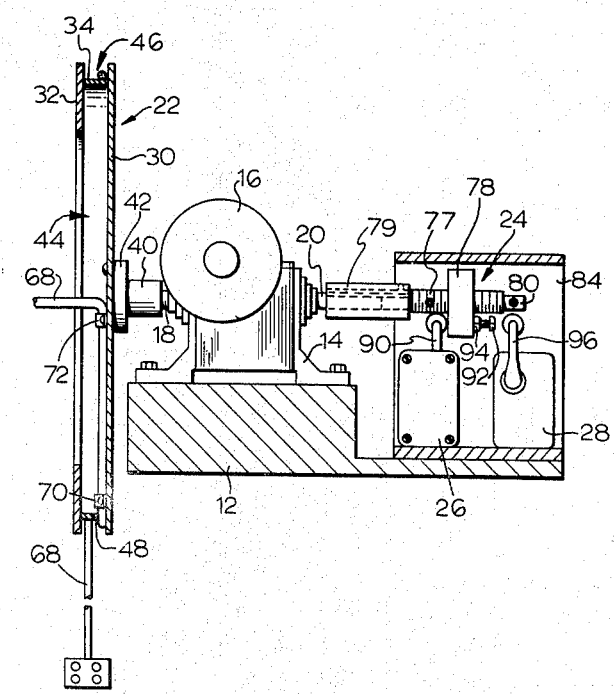

May 25, 1965  F. A. PELLICCIOTTI  3,185,399
WINDUP REEL FOR FLEXIBLE CONDUIT
Filed Feb. 26, 1963

United States Patent Office 3,185,399
Patented May 25, 1965

3,185,399
WINDUP REEL FOR FLEXIBLE CONDUIT
Fernando A. Pellicciotti, Inglewood, Calif., assignor to Socony Mobil Oil Company, Inc., a corporation of New York
Filed Feb. 26, 1963, Ser. No. 261,131
8 Claims. (Cl. 242—54)

The present invention relates to windup reels for flexible conduits, and more particularly to a windup reel for an electrical cable that can be wound and unwound with one end of the cable fixed to the reel in a manner to simplify electrical connection thereto.

There are many applications wherein an overhead windup reel is advantageous for storing flexible conduits such as electrical cables, air hoses, or the like, in a retracted position in a manner to enable one end of the conduit to be lowered into position for use by an operator. One example of such an application is a new type of diagnostic center for analyzing the condition of automobile engines. In these centers the automobile is driven into position relative to a battery of special equipment. When the automobile is properly positioned, a starting switch is actuated to automatically bring some of the equipment into action for analyzing the engine of the car. In connection with this operation, an overhead windup reel for an electrical cable must be provided to lower an electric control box into position to be used by an operator to control the actuation of other special equipment for diagnosing the automobile engine. With such a windup reel, the problem is presented as to how to make the necessary electrical connections to the other end of the cable attached to the windup reel. In many prior art windup reels this is done by brushes and slip rings since the other end of the cable is rotated with the windup reel and therefore requires a sliding electrical connection.

In accordance with the present invention the windup reel comprises an outer annular wall supported by a radially extending wall. The flexible conduit is wound around the outer annular wall. The end of the conduit to which the electrical connection is to be made extends radially inwards through the annular wall and is clamped to the radially extending wall near the axis of the annular wall. From this clamp the conduit extends away from the reel along the axis thereof to a third clamp which is fixed. As the reel is rotated the conduit winds and unwinds on the annular wall and twists between the clamp on the radially extending wall and the fixed clamp.

Accordingly it is one object of the invention to provide a windup reel for a flexible conduit which enables one end of the conduit to be raised and lowered while the other end remains stationary.

It is another object of the invention to simplify the connection to one end of a flexible conduit wound about a windup reel in a manner to enable the other end of the conduit to be raised and lowered.

It is a still further object of the invention to provide a windup reel which is simple and rugged in construction, effective and dependable in operation, and economical to manufacture.

Figure 2:
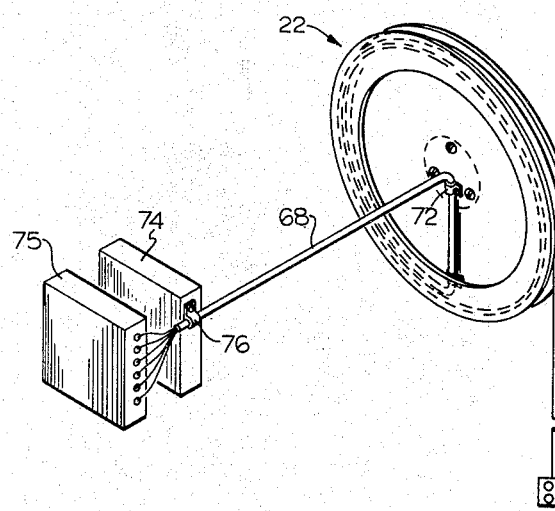

Other objects and features of novelty of the present invention will be specifically pointed out or will otherwise become apparent when referring, for a better understanding of the invention, to the following description taken in conjunction with the accompanying drawings, wherein:

FIG. 1 is a sectional view of a windup reel mechanism embodying features of the present invention; and FIG. 2 is a perspective view of the reel assembly illustrated in FIG. 1.

As shown in FIG. 1 the windup reel mechanism of the present invention comprises a base 12 having a speed-reducing unit 14 mounted on a central portion thereof in position to be driven by an electric motor 16. The speed-reducing unit 14 has two output shafts 18 and 20 with a windup reel assembly 22 mounted on the output shaft 18 for rotation therewith and a running nut assembly 24 mounted on the output shaft 20 for actuating a pair of limit switches 26 and 28, as will be described.

The windup reel assembly 22 comprises a pair of circular end walls 30 and 32 interconnected by a cylindrical wall 34. A sleeve 40 is keyed to the output shaft 18 and has a flange 42 projecting radially therefrom. The reel assembly 22 is fixed to the flange 42 by bolting the end wall 30 to the flange 42. The end wall 32 has a large annular aperture 44 in the center thereof. The end walls 30 and 32 extend out beyond the cylindrical wall 34 to define an annular groove 46. A stranded flexible electric cable 68 is wound on the cylindrical wall 34 in the groove 46. An aperture 48 is defined in the cylindrical wall 46 adjacent the end wall 30 and the cable 68 extends through the aperture 48 radially inwards to the axis of the shaft 18 and of the reel assembly 22. The cable 68 is fixed to the wall 30 by means of a clamp 70 just inside the cylindrical wall 34. The cable 68 is also fixed to the wall 30 by means of a clamp 72 near the axis of the reel assembly 22. After passing through the clamp 72, the cable 68 extends away from the reel assembly 22 along the axis thereof out through the aperture 44 to a stationary mounting block 74, to which the cable is fixed by means of a clamp 76 and the cable 68 is suspended between the clamp 76 and the clamp 72. From the clamp 76 the cable 68 runs to a terminal board 75 where electrical connections are made to the cable. Preferably the clamp 72 is an eye bolt with the cable passing through the eye of the eye bolt to reduce fraying of the cable. When the reel assembly 22 is rotated in a counter-clockwise direction as viewed in FIG. 2, the cable 68 winds on the cylindrical wall 34 in the groove 46 and the cable 68 is retracted. When the reel assembly 22 rotates in a clockwise direction, the cable unwinds from the cylindrical surface 34 and the cable 68 is extended. As the reel assembly 22 turns, the cable 68 twists between the clamps 72 and 76 thus permitting the rotation of the reel assembly 22 to wind and unwind the cable 68 without the use of slip rings and brushes.

In the preferred embodiment of the invention the cable 68 will be twisted ¾ of a turn between the clamps 76 and 72 in one direction when the cable 68 is fully extended and will be twisted ¾ of a turn in the opposite direction when the cable 68 is fully retracted. The cable 68 will be untwisted between the clamps 76 and 72 when the cable is half way between its fully extended and fully retracted positions. Preferably the length of the cable 68 between the clamps 76 and 72 is three feet so that the cable 68 twists ¼ turn in each foot of the cable 68 between the clamps 76 and 72.

The running nut assembly 24 comprises a threaded shaft 77 coupled to the output shaft 20 by a coupling sleeve 79. A rectangular running nut 78 is threadably mounted on the threaded shaft 77 and is held against rotation by a pair of slide blocks 80 bolted to the sides of a frame 84 which, in turn, is mounted on the base 12, the slide blocks 80 slidably riding in slots in the sides of the running nut 78.

In the position illustrated in FIG. 1, the left end face of the running nut 78 engages the actuating arm 90 of the limit switch 26 to trip this limit switch to provide a means for stopping the rotation of the windup reel 22 in its lowermost position. An adjusting screw 92 with a lock nut 94 projects from the right end face of the running nut in position to engage the actuating arm 96 of the limit switch 28 to provide a signal for stopping the rotation of the windup reel 22 after it has rotated through one and one-half turns to retract the cable 68 to its fully retracted position. By adjusting the projecting of the adjusting screw 92, the upper stop position can be controlled and by adjusting the starting position of the running nut 78 relative to the threaded sleeve, the lower stop position can be controlled. The limit switches 26 and 28 can be connected to a suitable control circuit (not shown) including a starting switch so that the electric motor 16 will be energized to cause the windup reel 22 to extend the cable when the starting switch is actuated. The limit switch 26 will then automatically stop the rotation of the windup reel when the cable 68 is extended to its fully extended position. When it is desired to retract the cable 68, the starting switch will be tripped again to energize the electric motor 16 to rotate the windup reel to retract the cable 68 and the rotation of the windup reel is automatically stopped when the limit switch 28 is tripped.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims. For example, although the particular embodiment illustrated relates to a stranded electrical cable, it is clear that the invention can also be advantageously utilized with other types of flexible conduits in which a fixed non-rotating end is advantageous, such as air hoses and hoses for grease guns which are used in gas stations and repair shops. With this construction of the present invention, these hoses can be conveniently wound in a retracted position when not in use and can be unwound when they are to be used, one end remaining stationary to facilitate connection to the hoses.

What is claimed is:

1. In combination, a windup reel having an outer annular winding surface and a radially extending wall supporting said annular winding surface, a flexible conduit wound upon said annular winding surface, means fixing a first point on said flexible conduit to said radially extending wall, means fixing a second point on said conduit, said windup reel and said first point being rotatable on the axis of said annular surface with respect to said second point, said second point being arranged with respect to said first point and said windup reel being constructed so that when said windup reel rotates on the axis of said annular winding surface said conduit twists between said first and second points, one end of said conduit extending from said annular winding surface to said first point and then extending from said first point directly away from said windup reel to said second point, the other end of said conduit extending tangentially away from said annular winding surface so that when said windup reel rotates on the axis of said annular winding surface said other end of said conduit winds and unwinds on said annular winding surface.

2. In combination a windup reel having an outer annular winding means, a flexible conduit wound upon said annular winding means, means fixing a first point on said conduit to turn with said windup reel, means fixing a second point on said conduit, said windup reel and said first point being rotatable on the axis of said annular means with respect to said second point, said second point being arranged with respect to said first point and said windup reel being constructed so that when said windup reel rotates on the axis of said annular winding means said conduit twists between said first and second points, one end of said conduit extending from said annular winding means to said first point and then extending from said first point directly away from said windup reel to said second point, the other end of said conduit extending tangentially away from said annular winding means so that when said windup reel rotates on the axis of said annular winding means said conduit winds and unwinds on said annular winding means.

3. In combination a windup reel having an annular winding means, a flexible conduit wound on said winding means, means fixing a first point on said conduit to turn with said windup reel near the axis of said annular winding means, means fixing a second point on said conduit, said windup reel and said first point being rotatable about the axis of said annular means with respect to said second point, one end of said conduit extending from said annular winding means to said first point and then extending from said first point axially away from said windup reel to said second point, the other end of said conduit extending tangentially away from said annular winding means, said windup reel being constructed so that when said windup reel is rotated said conduit winds and unwinds on said annular winding means and the portion of said conduit between said first and second points twists.

4. In combination a windup reel having an annular winding means, a flexible conduit wound on said winding means, means fixing a first point on said conduit to turn with said windup reel, means fixing a second point on said conduit, said windup reel and said first point being rotatable about the axis of said annular means with respect to said second point, one end of said conduit extending from said annular means to said first point and then extending from said first point directly away from said windup reel to said second point, the portion of said conduit between said first and second points being suspended, the other end of said conduit extending tangentially away from said annular winding means, said windup reel being constructed so that when said windup reel is rotated the portion of said conduit between said first and second points twists and said conduit winds and unwinds on said annular winding means.

5. In combination a windup reel having an annular winding means, a flexible conduit wound on said winding means, means fixing a first point on said conduit to turn with said windup reel, means fixing a second point on said conduit, said windup reel and said first point being rotatable about the axis of said winding means relative to said second point, one end of said conduit extending from said winding means to said first point and then extending from said first point directly away from said windup reel to said second point, said second point being axially spaced far enough from said first point and said windup reel being constructed so that said conduit twists between said first and second points when said windup reel is rotated on the axis of said winding means, the other end of said conduit extending tangentially away from said annular winding means so that as said windup reel is rotated on the axis of said annular winding means said conduit winds and unwinds on said annular winding means.

6. In combination a windup reel having an annular winding means, a flexible conduit wound on said annular winding means, clamp means fixing a first point on said conduit to turn with said windup reel, clamp means fixing a second point on said conduit, said windup reel and said first point being rotatable on the axis of said annular winding means with respect to said second point, said second point being arranged with respect to said first point and said windup reel being constructed so that said conduit twists between said first and second points when said windup reel is rotated on the axis of said winding means, one end of said conduit extending from said winding means to said first point and then extending from said first point directly away from said windup reel to said second point, the other end of said conduit extending tangentially away from said winding means so that when said windup reel is rotated on the axis of said winding means said conduit winds and unwinds on said winding means between a fully extended position and a fully retracted position, the portion of said conduit between said first and second points being untwisted when said conduit is midway between its fully extended and fully retracted positions.

7. In combination a windup reel having an outer annular winding means, means to rotate said windup reel between first and second angular positions, a flexible conduit wound upon said annular winding means, means fixing a first point on said conduit to turn with said windup reel, means fixing a second point on said conduit, said windup reel and said first point being rotatable about the axis of said annular means with respect to said second point, said second point being arranged with respect to said first point and said windup reel being constructed so that when said windup reel rotates on the axis of said annular winding means said conduit twists between said first and second points, one end of said conduit extending from said annular winding means to said first point and then extending from said first point directly away from said windup reel to said second point, the other end of said conduit extending tangentially away from said annular winding means so that when said windup reel is rotated between said first and second angular positions said conduit winds and unwinds on said annular winding means.

8. In combination a windup reel having an outer annular winding surface and a radially extending wall supporting said annular winding surface, said windup reel defining an opening in a plane parallel to and spaced from said radially extending wall, said opening being positioned so that the axis of said annular winding surface passes through said opening, a flexible conduit wound upon said annular winding surface, means fixing a first point on said flexible conduit to said radially extending wall, means fixing a second point on said conduit, said windup reel and said first point being rotatable about the axis of said annular surface with respect to said second point, said second point being arranged with respect to said first point and said windup reel being constructed so that when said windup reel rotates on the axis of said annular winding surface said conduit twists between said first and second points, one end of said conduit extending from said annular winding surface to said first point and then extending from said first point through said opening directly away from said windup reel to said second point, the other end of said conduit extending tangentially away from said annular winding surface so that when said windup reel rotates on the axis of said annular winding surface said other end of said conduit winds and unwinds on said annular winding surface.

References Cited by the Examiner
UNITED STATES PATENTS

| | | | |
|---|---|---|---|
| 1,408,261 | 2/22 | Brookhart | 242—125.2 X |
| 2,420,594 | 5/47 | Hall. | |
| 2,576,335 | 11/51 | Fanslow | 242—96 |

MERVIN STEIN, *Primary Examiner.*